(12) United States Patent
Fukuda et al.

(10) Patent No.: US 10,436,294 B2
(45) Date of Patent: Oct. 8, 2019

(54) TOROIDAL CONTINUOUSLY VARIABLE TRANSMISSION

(71) Applicants: NSK Ltd., Shinagawa-ku, Tokyo (JP); HONDA MOTOR CO., LTD., Minato-ku, Tokyo (JP)

(72) Inventors: Kota Fukuda, Kanagawa (JP); Toshirou Toyoda, Kanagawa (JP); Hiroki Nishii, Kanagawa (JP); Toshihiro Saito, Saitama (JP)

(73) Assignees: NSK LTD., Tokyo (JP); HONDA MOTOR CO., LTD., Tokyo (JP)

( * ) Notice: Subject to any disclaimer, the term of this patent is extended or adjusted under 35 U.S.C. 154(b) by 379 days.

(21) Appl. No.: 15/301,372

(22) PCT Filed: Mar. 24, 2015

(86) PCT No.: PCT/JP2015/058918
§ 371 (c)(1),
(2) Date: Sep. 30, 2016

(87) PCT Pub. No.: WO2015/151932
PCT Pub. Date: Oct. 8, 2015

(65) Prior Publication Data
US 2017/0114876 A1    Apr. 27, 2017

(30) Foreign Application Priority Data
Apr. 2, 2014  (JP) .................................. 2014-076346

(51) Int. Cl.
*F16H 15/38*   (2006.01)
*F16D 1/09*    (2006.01)
(Continued)

(52) U.S. Cl.
CPC ............... *F16H 15/38* (2013.01); *F16D 1/09* (2013.01); *F16D 1/116* (2013.01); *F16D 2001/103* (2013.01)

(58) Field of Classification Search
CPC . F16H 15/36; F16D 1/09; F16D 1/116; F16D 2001/103
See application file for complete search history.

(56) References Cited

U.S. PATENT DOCUMENTS 5,027,668 A * 7/1991 Nakano .................. F16H 15/38
                                                184/6.12
5,368,529 A    11/1994 Machida
(Continued)

FOREIGN PATENT DOCUMENTS

JP          6-6789 U      1/1994
JP        2000-205361 A   7/2000
(Continued)

OTHER PUBLICATIONS

International Search Report from International Patent Application No. PCT/JP2015/058918, dated Jun. 16, 2015.

*Primary Examiner* — William Kelleher
*Assistant Examiner* — Gregory T Prather
(74) *Attorney, Agent, or Firm* — Shapiro, Gabor and Rosenberger, PLLC

(57) ABSTRACT

Fletching wear caused by elastic deformation in the axial direction of an input-side disk 2c due to thrust force of a pressure device is prevented. A female-spline section 13a formed around the middle section in the axial direction of the inner-circumferential surface of a center hole 19 in the input-side disk 2c and a male-spline section 12a formed around the outer-circumferential surface of one end section in the axial direction of an input rotating shaft 1b engage with a spline engagement. A disk-side fitting surface section 22 formed around a portion of the inner-circumferential (Continued)

surface of the center hole 19 in the input-side disk 2c that is adjacent to the other end side of the female-spline section 13a and a shaft-side fitting surface section 23 formed around a portion of the outer-circumferential surface of the input rotating shaft 1b that is adjacent to the other end side of the male spline section 12a are fitted together with an interference fit.

1 Claim, 7 Drawing Sheets

(51) Int. Cl.
 *F16D 1/116* (2006.01)
 *F16D 1/10* (2006.01)

(56) References Cited

U.S. PATENT DOCUMENTS

| | | | | |
|---|---|---|---|---|
| 6,740,001 | B1* | 5/2004 | Ishikawa | F16H 15/38 476/41 |
| 2005/0043137 | A1* | 2/2005 | Shinoda | F16C 19/30 476/40 |
| 2005/0215184 | A1* | 9/2005 | Hirata | B24B 19/06 451/178 |
| 2006/0247090 | A1* | 11/2006 | Nishii | F16H 15/38 476/40 |
| 2008/0305920 | A1* | 12/2008 | Nishii | F16H 15/38 476/42 |
| 2013/0035200 | A1* | 2/2013 | Noji | F16H 63/065 476/42 |
| 2013/0053211 | A1* | 2/2013 | Fukuda | F16H 15/38 476/10 |
| 2013/0260954 | A1* | 10/2013 | Arai | F16H 15/38 476/40 |
| 2016/0178036 | A1* | 6/2016 | Kita | F16H 15/38 476/10 |
| 2016/0230856 | A1* | 8/2016 | Dohi | F16H 15/38 |
| 2017/0030439 | A1* | 2/2017 | Tanaka | F16H 15/38 |
| 2017/0045123 | A1* | 2/2017 | Kishida | F16H 15/38 |
| 2017/0114876 | A1* | 4/2017 | Fukuda | F16D 1/09 |

FOREIGN PATENT DOCUMENTS

| | | |
|---|---|---|
| JP | 2002-021961 A | 1/2002 |
| JP | 2003-021206 A | 1/2003 |
| JP | 2003-214516 A | 7/2003 |
| JP | 2004-169719 A | 6/2004 |
| JP | 2007-315595 A | 12/2007 |
| JP | 2008-025821 A | 2/2008 |
| JP | 2008-275088 A | 11/2008 |
| JP | 2009-041715 A | 2/2009 |
| JP | 2013-221569 A | 10/2013 |

* cited by examiner

TOROIDAL CONTINUOUSLY VARIABLE TRANSMISSION

TECHNICAL FIELD

The present invention relates to a toroidal continuously variable transmission that is used as an automobile transmission apparatus or as a transmission apparatus for adjusting the operational speed of various kinds of industrial machinery such as a pump.

BACKGROUND ART

A half-toroidal continuously variable transmission such as disclosed in JP2003214516A, JP2007315595A, JP2008025821A, and JP2008275088A is used as an automobile transmission apparatus. Moreover, JP2004169719A discloses construction in which the range of adjustment of the transmission ratio is made wider by combining a toroidal continuously variable transmission and a planetary gear mechanism.

FIG. 2 illustrates a first example of conventional construction of a toroidal continuously variable transmission. In this first example of conventional construction, a pair of input-side disks 2a, 2b are supported around both end sections in the axial direction of an input rotating shaft 1 by a ball spline 18 so that one side surface in the axial direction of each, which are toroidal curved surfaces, face each other, and so that the disks 2a, 2b are able to move away from each other or closer to each other, and are able to rotate in synchronization with the input rotating shaft 1. An output cylinder 3 is supported around the middle section in the axial direction of the input rotating shaft 1 so as to be able to rotate with respect to the input rotating shaft 1. An output gear 4 is fastened around the center section in the axial direction of the outer-circumferential surface of the output cylinder 3, and a pair of output-side disks 5 are supported by a spline joint on both end sections in the axial direction of the outer-circumferential surface of the output cylinder 3 so as to be able to rotate in synchronization with the output cylinder 3. In this state, one side surface in the axial direction of each of the pair of output-side disks 5, which are toroidal curved surfaces, face one side surface in the axial direction of the input-side disks 2a, 2b.

Plural power rollers 6, having convex spherical circumferential surfaces, are held between one side surface in the axial direction of one of the input-side disks 2a (disk on the left side in FIG. 2) and one side surface in the axial direction of one of the output-side disks 5, and between one side surface in the axial direction of the other input-side disk 2b (disk on the right side in FIG. 2) and one side in the axial direction of the other output-side disk 5. The power rollers 6 are supported by a trunnion 7 as a support member so as to be able to roll freely, and these rollers 6 roll as the input-side disks 2a, 2b rotate, and transmit power from the input-side disks 2a, 2b to the output-side disks 5. In other words, when the toroidal continuously variable transmission is operating, a drive shaft 8 rotates and drives one of the input-side disks 2a by way of a pressing device 9, which is a loading cam. As a result, the pair of input-side disks 2a, 2b that are supported on both end sections in the axial direction of the input rotating shaft 1 rotate in synchronization while being pressed in a direction toward each other. The rotation of the pair of input-side disks 2a, 2b is transmitted to the pair of output-side disks 5 by way of the power rollers 6, and obtained from the output gear 4.

In the case of the first example of conventional construction, pre-loaded springs 10a, 10b that are disc springs or the like having large elastic force are provided in positions near both ends in the axial direction of the input rotating shaft 1 so as to hold the pair of input-side disks 2a, 2b from both sides in the axial direction of the input rotating shaft 1. These pre-loaded springs 10a, 10b maintain the minimum required amount of surface pressure at areas of rolling contact (tractions sections) between the circumferential surfaces of the power rollers 6 and the one side surface in the axial direction of the input-side disks 2a, 2b and the output-side disks 5 even when the pressing device 9 is not operating (when the drive shaft 8 is stopped). With this kind of construction, the areas of rolling contact can start transmitting power immediately at the start of operation of the toroidal continuously variable transmission without a large amount of slipping occurring.

The elastic force for maintaining the minimum required amount of surface pressure at the areas of rolling contact is obtained by the pre-loaded spring 10a of the pre-loaded springs 10a, 10b that is arranged between one of the input-side disks 2a and one end in the axial direction of the input rotating shaft 1 (pressing device 9). The other pre-loaded spring 10b that is arranged between a loading nut 11 that is screwed onto the other end section in the axial direction of the input rotating shaft 1 (right end section in FIG. 2) and the other input-side disk 2b is for easing impact that is applied during sudden operation of the pressing device 9, and could be omitted. When the other pre-loaded spring 10b is provided, that pre-loaded spring 10b is given sufficiently large elastic force, or in other words, enough elastic force so as not to be completely pressed between the input-side disks 2a, 2b and the output-side disks 5 when transmitting large torque.

In the case of this kind of toroidal continuously variable transmission, the work of adjusting the elastic force of the one pre-loaded spring 10a in order to maintain the minimum required surface pressure at the areas of rolling contact is troublesome. More specifically, in the case of the first example of conventional construction, it is necessary to adjust the elastic force of the one pre-loaded spring 10a by changing the amount of tightening of the loading nut 11 that is screwed onto the other end section in the axial direction of the input rotating shaft 1, which is troublesome. In regard to this, JP2000205361A and JP2009041715 disclose construction in which a locking ring called a cotter is used instead of a loading nut.

FIG. 3 to FIG. 6 illustrate a second example of conventional construction in which this kind of locking ring is incorporated. In the case of this second example of conventional construction, a female spline section 12 is formed so as to cover the range from the middle section in the axial direction of the inner-circumferential surface of the input-side disk 2b to the other end section in the axial direction (right end section in FIG. 3 to FIG. 5), and a male spline section 13 is formed around the outer-circumferential surface of the other end section in the axial direction (portion near the right end in FIG. 3 and FIG. 4) of the input rotating shaft 1a, and this female spline section 12 fits with the male spline section 13. Moreover, a locking groove 14 is formed around the entire circumference of a portion of the outer-circumferential surface of the input rotating shaft 1a that is adjacent to the other end side (right side in FIG. 3 and FIG. 4) of the male spline section 13, and the inner half section in the radial direction of a locking ring 15 that is composed of plural (2 to 4) partial circular-arc shaped elements is locked into the locking groove 14. The outer half section in the radial direction of one end surface in the axial direction (left side surface in FIG. 3 and FIG. 4) of the locking ring 15 comes in contact with the inside-end section in the radial direction of the other end surface in the axial direction of the input-side disk 2b.

The elastic force of the one pre-loaded spring 10a that is for maintaining the minimum required surface pressure at the areas of rolling contact between the circumferential surfaces of the power rollers 6 (see FIG. 2) and the one side surfaces in the axial direction of the input-side disks 2a, 2b when the hydraulic type pressing device 9a is not operating is adjusted by the thickness in the axial direction of the locking ring 15 (by selecting a locking ring having an appropriate thickness dimension in the axial direction). Moreover, a restraining ring 16 having a L-shaped cross section is fitted around the outside of the other end section in the axial direction of the input rotating shaft 1a in a portion that is adjacent in the axial direction of the input rotating shaft 1a to the other end side of the locking groove 14, and by causing that restraining ring 16 to come in direct contact with or to closely face the outer-circumferential surface of the locking ring 15, the plural elements of the locking ring 15 are prevented from coming out from the locking groove 14. The displacement of the restraining ring 16 in the axial direction of the input rotating shaft 1a is prevented by a retaining ring 17 that is locked in the other end section in the axial direction of the input rotating shaft 1a on the other end side in the axial direction of the input rotating shaft 1a of the restraining ring 16. In this second example of conventional construction, by using an integrated type output-side disk 5a, it is possible to make the overall toroidal continuously variable transmission more compact and lightweight. However, the construction and function of the integrated type output-side disk 5a is not related to the scope of the present invention, so an explanation here is omitted.

In the case of the toroidal continuously variable transmission of this second example of conventional construction, the other input-side disk 2b of the pair of input-side disks 2a, 2b that is arranged on the other end side in the axial direction of the input rotating shaft 1a elastically deforms during operation in a direction (axial direction) such that the portion near the outer diameter of the other input-side disk 2b moves toward the locking ring 15 side due to a force that is received from the power rollers 6 due to thrust that is generated by the pressing device 9 as exaggeratedly illustrated in FIG. 7. In other words, the force applied to the other input-side disk 2b due to thrust that is generated by the pressing device 9 during operation becomes a maximum during operation of the toroidal continuously variable transmission, and is tens of kN to hundreds of kN (several tF to tens of tF). Therefore, the amount of elastic deformation in the axial direction of the other input-side disc 2b due to force that is applied to the other input-side disk 2b due to thrust that is generated by the pressing device 9 during operation is several tenths of a mm (several 0.1 mm), which is an amount that cannot be ignored. When the other input-side disk 2b elastically deforms in the axial direction, rubbing occurs by continuous repeated contact between the other end surface in the axial direction of the other input-side disk 2b and one end surface in the axial direction of the locking ring 15, and there is a possibility that fletching wear will occur in the area of contact between the other end surface in the axial direction of the other input-side disk 2b and one end surface in the axial direction of the locking ring 15. Particularly, the position in the circumferential direction where the other input-side disk 2b elastically deforms constantly changes as the portion that is pressed by the power rollers 6 changes. Therefore, the frequency that rubbing occurs between the other end surface in the axial direction of the other input-side disk 2b and one end surface in the axial direction of the locking ring 15 becomes very high (about a hundred and several tens of Hz), and becomes a severe condition from the aspect of the occurrence of fletching wear.

Furthermore, in the case of this second example of conventional construction, a female spline section 12 is provided in the range from the middle section in the axial direction of the inner-circumferential surface of the input-side disk 2b to the other end section, so as the other input-side disk elastically deforms, rubbing occurs by continuous repeated contact between the edge of the other end in the axial direction (edge on the right end in FIG. 3 and FIG. 4) of the female spline groove of the female spline section 12 and one end surface in the axial direction (left side surface in FIG. 3 and FIG. 4) of the locking ring 15, and the edge on the other end in the axial direction of the female spline groove tries to bite into the one end surface in the axial direction of the locking ring 15. From this aspect, it can be said that fletching wear is easy to occur. Fletching wear is the starting point of damage such as pealing, and there is a possibility that the abrasion powder that is generated will contaminate the lubrication oil (traction oil), creating a poor lubrication state in all areas.

RELATED LITERATURE

Patent Literature

[Patent Literature 1] JP2003214516 (A)
[Patent Literature 2] JP2007315595 (A)
[Patent Literature 3] JP2008025821 (A)
[Patent Literature 4] JP2008275088 (A)
[Patent Literature 5] JP2004169719 (A)
[Patent Literature 6] JP2000205361 (A)
[Patent Literature 7] JP2009041715 (A)

SUMMARY OF INVENTION

Problems to be Solved by Invention

Taking into consideration the situation described above, the object of the present invention is to achieve construction of a toroidal continuously variable transmission that is able to prevent the occurrence of fletching wear between outside disks and locking members due to thrust that is generated by a pressing device.

Means for Solving Problems

The toroidal continuously variable transmission of the present invention includes a rotating shaft, a pair of outside disks, an inside disk, plural support members, plural (same number as the number of support members) power rollers, a pressing device, and a locking member.

The pair of outside disks are such that each includes one side surface in the axial direction that has a circular arc-shaped cross section and that faces toward the inside in the axial direction of the rotating shaft, and these disks are supported by one end section and the other end section of the rotating shaft so as to rotate in synchronization with the rotating shaft. The inside disk includes side surfaces on both sides in the axial direction, each surface having a circular arc-shaped cross section that faces toward the outside in the axial direction of the rotating shaft, and this inside disk is supported around the middle section in the axial direction of the rotating shaft with each of the side surfaces on both sides in the axial direction facing the one side surfaces in the axial direction of the pair of outside disks and is able to rotate freely relative to the rotating shaft. As the inside disk, it is possible to use an inside disk that is an integrated disk, or it is also possible to use an inside disk that is formed by joining a pair of elements.

The support members are such that each includes a pivot shaft in a skewed position with respect to the rotating shaft, with plural support members provided between both side surfaces in the axial direction of the inside disk and the one side surfaces in the axial direction of the pair of outside disks so as to be able to pivotally displace freely centered around the pivot shaft. The power rollers are supported by the support members so as to be able to roll freely, each including a circumferential surface that is a spherical convex surface, with those surfaces coming in contact with the both side surfaces in the axial direction of the inside disk and the one side surfaces in the axial direction of the pair of outside disks.

The pressing device is provided between the rotating shaft and one of the outside disks of the pair of outside disks that is arranged on one end section of the rotating shaft, and this pressing device presses the one outside disk toward the other outside disk of the pair of outside disks that is arranged on the other end section of the rotating shaft. As the pressing device, it is possible to use either a mechanical pressing device such as a loading cam, or a hydraulic pressing device. The locking member is locked in a portion of the other end section in the axial direction of the rotating shaft that protrudes toward the other end side from the other outside disk in order to prevent the other outside disk from displacing in a direction away from the one outside disk.

A female-spline section is formed around the middle section in the axial direction of the inner-circumferential surface of the other outside disk, and a disk-side fitting surface section having a circular cross-sectional shape is formed around a portion of the inner-circumferential surface of the other outside disk that is adjacent to the other end side of the female-spline section. A male-spline section is formed around the other end section in the axial direction of the outer-circumferential surface of the rotating shaft, and a shaft-side fitting surface section having a circular cross-sectional shape is formed around a portion of the outer-circumferential surface of the rotating shaft that is adjacent to the other end side of the male-spline section. By the female-spline section and male-spline section fitting with a spline fit, and the disk-side fitting surface section and the shaft-side fitting surface section fitting together with an interference fit, the other outside disk is supported by the rotating shaft so as to be able to rotate freely in synchronization with the rotating shaft (so that power can be transmitted between the other outside disk and the rotating shaft).

When embodying the toroidal continuously variable transmission of the present invention, it is possible to uses a locking ring called a cotter as the locking member. The locking ring is constructed by combining together plural (for example, two to four) partially circular arc-shaped elements to form a complete circular ring shape, and this locking member is locked into a locking concave groove that is formed in a portion of the other end section in the axial direction of the rotating shaft that protrudes toward the other end side in the axial direction from the other outside disk. By bringing the outer half section of the one end surface in the axial direction of the locking ring (portion that is exposed from the locking groove) into contact with the other end surface in the axial direction of the other outside disk, the other outside disk is prevented from displacing in a direction away from the one outside disk.

Moreover, it is also possible to use a loading nut as the locking member. The locking member is screwed and tightened on a male screw section that is formed on a portion of the other end section in the axial direction of the rotating shaft that protrudes toward the other end side in the axial direction from the other outside disk. Then, by the tip-end section of the loading nut coming in contact with the other end surface in the axial direction of the other outside disk directly or by way of another member such as a pre-loaded spring, the other outside disk is prevented from displacing in a direction away from the one outside disk.

EFFECT OF INVENTION

With the toroidal continuously variable transmission of the present invention, the occurrence of fletching wear between the outside disk (the other outside disk) and the locking member due to thrust that is generated by the pressing device is prevented. In other words, in portion of the engaging section (fitting section) between the inner-circumferential surface of the outside disk and the outer-circumferential surface of the rotating shaft that is adjacent in the axial direction to the locking member, a disk-side fitting surface section having a circular-shaped cross section and that is formed around the inner-circumferential surface of the outside disk, and a shaft-side fitting surface section having a circular-shaped cross section and that is formed around the outer-circumferential surface of the rotating shaft fit together with an interference fit. Therefore, it is possible to increase the support rigidity of the rotating shaft that supports the end section (other end section in the axial direction) of the outside disk. Moreover, it is possible to increase the rigidity in the diameter contracting direction of the end section of the locking member side of the inner-circumferential surface of the outside disk. Therefore, elastic deformation in the diameter contracting direction of the end section of the locking member side of the inner-circumferential surface of the outside disk due to thrust that is generated by the pressing device is suppressed, and furthermore, elastic deformation in the axial direction of the portion near the outer diameter of the outside disk is suppressed (it is possible to decrease the amount of elastic deformation in the axial direction of the outside disk). As a result, the occurrence of severe fletching wear between the outside disk and the locking member due to rubbing of the other end surface in the axial direction of the outside disk and one end surface in the axial direction of the locking member with each other is prevented.

Moreover, the edges on the other end in the axial direction of the female-spline grooves of the female-spline section that is formed around the inner-circumferential surface of the outside disk and the one end surface in the axial direction of the locking member are separated from each other in the axial direction of the rotating shaft. Therefore, even when it is presumed that the outside disk elastically deformed in the axial direction due to thrust that is generated by pressing device, the edges on the other end in the axial direction of the female-spline grooves do not bite into the surface of one end in the axial direction of the locking member. From this aspect as well, the occurrence of fletching wear between the outside disk and the locking member is prevented.

MODES FOR CARRYING OUT INVENTION

Figure 1:
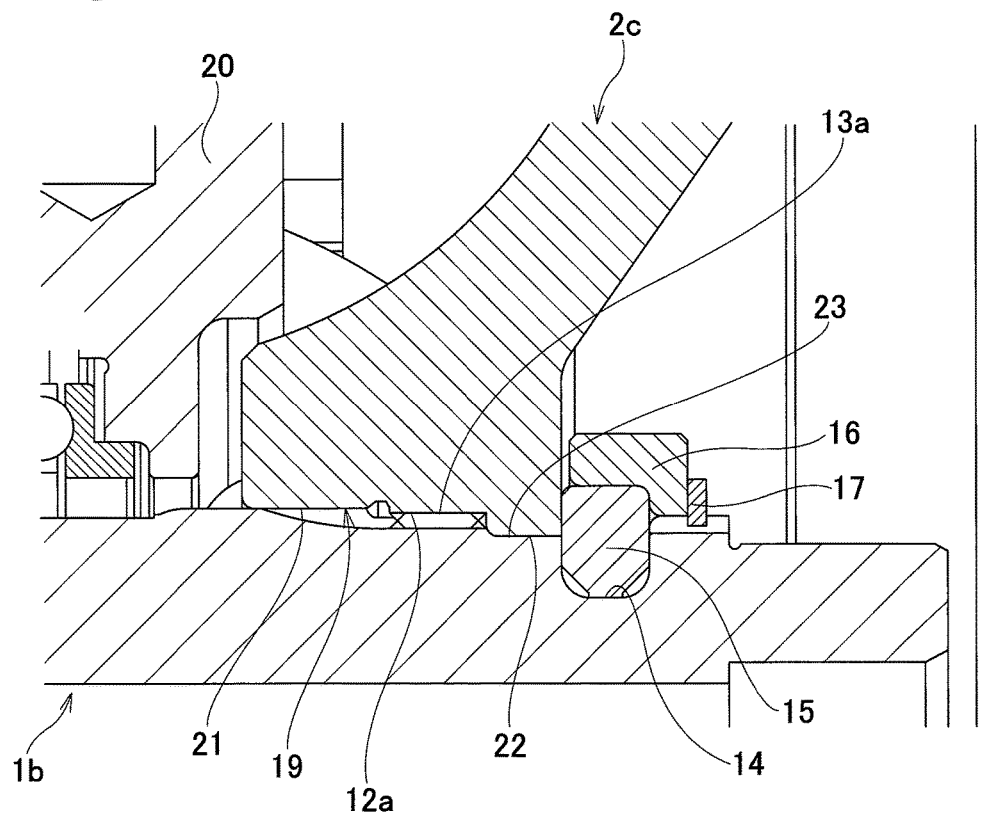
FIG. 1A is an enlarged cross-sectional view of the main parts, and illustrates an example of an embodiment of the toroidal continuously variable transmission of the present invention.
FIG. 1B is a cross-sectional view of a portion of the engagement section between the other input-side disk and the input rotating shaft that corresponds to one end section in the axial direction of the other input-side disk.
FIG. 1C is a cross-sectional view of a portion that corresponds to the middle section in the axial direction of the other input-side disk.
FIG. 1D is a cross-sectional view of a portion that corresponds to the other end section in the axial direction of the other input-side disk.
Figure 1:
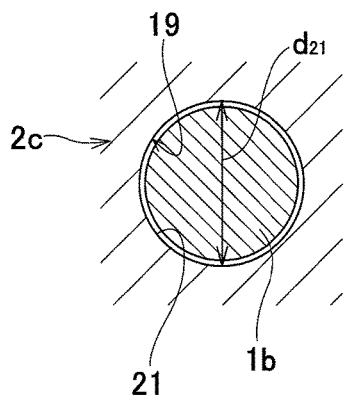
Figure 1:
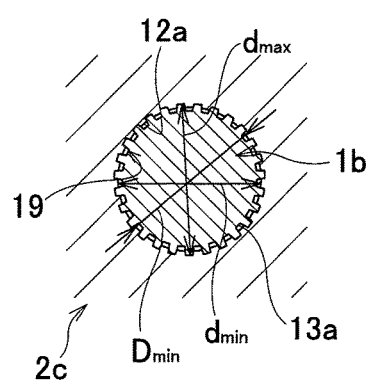
Figure 1:
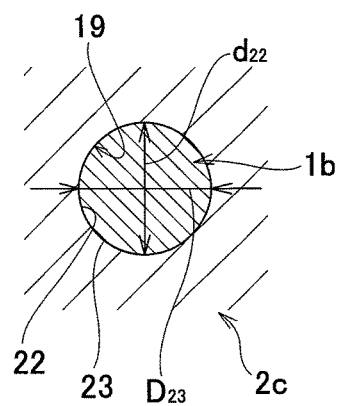

FIG. 1 illustrates an example of an embodiment of the toroidal continuously variable transmission of the present invention. The toroidal continuously variable transmission of this example, as in the second example of a conventional toroidal continuously variable transmission illustrated in FIG. 3 to FIG. 6, includes an input rotating shaft 1b as a rotating shaft, a pair of input-side disks 2a, 2c as a pair of outside disks, an output side disk 5a as an inside disk, plural trunnions 7 as support members, plural power rollers 6, a pressing device 9a, and a locking ring 15 as a locking member.

The pair of input-side disks 2a, 2c include one input-side disk 2a that is arranged around one end section of the input rotating shaft 1b, and another input-side disk 2c that is arranged around the other end section of the input rotating shaft 1b. The one input-side disk 2a and the other side disc 2c both include one side surface in the axial direction that is a toroidal surface having a circular arc-shaped cross section, and that faces the inside in the axial direction of the input rotating shaft 1b. The pair of input-side disks 2a, 2c are such that the one side surfaces in the axial direction face each other, and are supported so as to be able to move toward each other or away from each other, and so as to be able to rotate in synchronization with the input rotating shaft 1b.

An integrated-type output-side disk 5a is supported around the middle section in the axial direction of the input rotating shaft 1b so as to be able to rotate freely relative to the input rotating shaft 1b. The output-side disk 5a is such that both side surfaces in the axial direction are toroidal curved surfaces having a circular arc-shaped cross section, with both of these side surfaces facing toward the outside in the axial direction of the rotating shaft. Of both of the side surfaces in the axial direction of the output-side disk 5a, one side surface in the axial direction that faces one end side faces the one side surface in the axial direction of the one input-side disk 2a, and of both side surfaces in the axial direction of the output-side disk 5a, the other side surface in the axial direction that faces the other end side faces the one side surface in the axial direction of the other input-side disk 2c. An output gear 4a is formed around the outer-circumferential surface of the output-side disk 5a. Instead of an integrated-type output-side disk 5a, it is also possible to use a pair of output-side disks 5 that include a pair of output-side disk elements that have been joined together and that each have a side surface in the axial direction.

The trunnions 7 have pivot shafts in positions that are skewed with respect to the input rotating shaft 1b, are located in positions in the axial direction of the input rotating shaft 1b between both sides in the axial direction of the output-side disk 5a and the one side surfaces in the axial direction of the pair of input-side disks 2a, 2c, and each of plural trunnions 7 are supported by the housing or a fixed member in the housing of the toroidal continuously variable transmission so as to be able to freely displace pivotally centered around the pivot shaft. A power roller 6 (see FIG. 2) is supported by each trunnion 7 so as to freely rotate. Each of the power rollers 6 has a circumferential surface that is a spherical convex surface, and these circumferential surfaces are held between both side surfaces in the axial direction of the output-side disk 5a and the one side surfaces in the axial direction of the input-side disks 2a, 2c.

The pressing device 9a is provided between the input rotating shaft 1b and the one input-side disk 2a of the pair of input-side disks 2a, 2c that is located on one end section of the input rotating shaft 1b. As the pressing device 9a, it is possible to use either a mechanical type pressing device such as a loading cam or a hydraulic type pressing device. During operation of the toroidal continuously variable transmission of this example, the one input-side disk 2a is rotated and driven by the drive shaft 8 (see FIG. 2) by way of the pressing device 9a. As a result, the one input-side disk 2a is pressed toward the other input-side disk 2c of the pair of input-side disks 2a, 2c that is located on the other end section of the input rotating shaft 1b. In other words, the pair of input-side disks 2a, 2c rotate in synchronization while being pressed in a direction toward each other. The rotation of the pair of input-side disks 2a, 2c is transmitted to the output-side disk 5a by way of the power rollers 6, and obtained from the output gear 4a.

A pre-loaded spring 10a is provided between the one input-side disk 2a and the input rotating shaft 1b (or pressing device 9a). As a result, even when the pressing device 9a is not operating, the surface pressure at the areas of rolling contact (traction sections) between the circumferential surfaces of the power rollers 6 and the one side surfaces in the axial direction of the input-side disks 2a, 2c and both side surfaces in the axial direction of the output-side disk 5a is maintained at the minimum required amount, and it is possible to start transmitting power immediately after operation of the toroidal continuously variable transmission operates without excess slipping occurring at the areas of rolling contact.

In the case of this example, a center hole 19 is provided in the center section of the other input-side disk 2c so as to pass in the axial direction through the other input-side disk 2c. A female spline section 12a is formed in only the middle section in the axial direction of the inner-circumferential surface of the center hole 19. Moreover, a disk-side cylindrical surface section 21, having a cross-sectional shape on a virtual plane that is orthogonal to the center axis of the other input-side disk 2c that is a circle with the center axis of the other input-side disk 2c as the center and with the inner diameter not changing in the axial direction, is formed on the one end section in the axial direction (portion adjacent to the one end side of the female spline section 12a; left-end section in FIG. 1) of the inner-circumferential surface of the center hole 19. The inner diameter $d_{21}$ of the disk-side cylindrical surface section 21 is greater than the root diameter (maximum inner diameter) $d_{max}$ of the female spline section 12a ($d_{21} > d_{max}$). On the other hand, a disk-side fitting surface section 22, having a cross-sectional shape on a virtual plane that is orthogonal to the center axis of the other input-side disk 2c that is a circle with the center axis of the other input-side disk 2c as the center and with the inner diameter not changing in the axial direction, is formed on the other end section in the axial direction (portion adjacent to the other end side of the female spline section 12a; right-end side in FIG. 1) of the inner-circumferential surface of the center hole 19. The inner diameter $d_{22}$ of the disk-side fitting surface section 22 is less than the tip diameter (minimum inner diameter) $d_{min}$ of the female spline section 12a ($d_{22} < d_{min}$).

On the other hand, a male spline section 13a that engages with the female spline section 12a of the other input-side disk 2c is provided on a part (portion near the right end in FIG. 1) of the other end section in the axial direction of the input rotating shaft 1b. A shaft-side fitting surface section 23 having a circular shape centered around the center axis of the input rotating shaft 1b, the outer diameter not changing in the axial direction, is provided in a portion of the outer-circumferential surface of the input rotating shaft 1b that is adjacent to the other end side of the male spline section 13a. The outer diameter $D_{23}$ of the shaft-side fitting surface section 23 is less than the root diameter (minimum outer diameter) $D_{min}$ of the male spline section 13a ($D_{23} < D_{min}$). Moreover, the outer diameter in the free state of the shaft-side fitting surface section 23 (state before the other input-side disk 2c is assembled on the input rotating shaft 1b) is a little larger than the inner diameter of the disk-side fitting surface section 22 in the free state.

The locking groove 14 in which the inner half section in the radial direction of the locking ring 15 is locked, which is a locking member, is provided around a portion of the outer-circumferential surface of the input rotating shaft 1b that is adjacent to the other end side of the shaft-side fitting surface section 23.

When assembling the other input-side disk 2c on the input rotating shaft 1b, the other end section in the axial direction of the input rotating shaft 1b is inserted inside the center hole 19 in the other input-side disk 2c from the one end side in the axial direction of the input-side disk 2c. By engaging the male spline section 13a with the female spline section 12a with a spline engagement, and pressure fitting the shaft-side fitting surface section 23 inside the disk-side fitting surface section 22, the shaft-side fitting surface section 23 and the disk-side fitting surface section 22 are fitted together with an interference fit. In this state, the locking ring 15 is locked in the locking groove 14, and the portion of one end surface in the axial direction of the locking ring 15 that protrudes outward in the radial direction from the locking groove 14 (outer half in the radial direction) is brought in contact with the other end surface in the axial direction of the other input-side disk 2c. Moreover, the locking ring 15 is prevented from coming out from the locking groove 14 by the restraining ring 16 and retaining ring 17. With this kind of construction, the other input-side disk 2c is prevented from displacing in a direction going away from the one input-side disk 2a, or in other words, is prevented from displacing to the other end side in the axial direction of the input rotating shaft 1b, and the other input-side disk 2c is supported by the input rotating shaft 1b so as to be able to rotate freely in synchronization with the input rotating shaft 1b (so as to be able to transmit power between the other input-side disk 2c and the input rotating shaft 1b). In this example, the portion of the outer-circumferential surface of the input rotating shaft 1b that is adjacent to the one end side of the male spline section 13 and the disk-side cylindrical surface section 21 fit together with a clearance fit.

Figure 7:
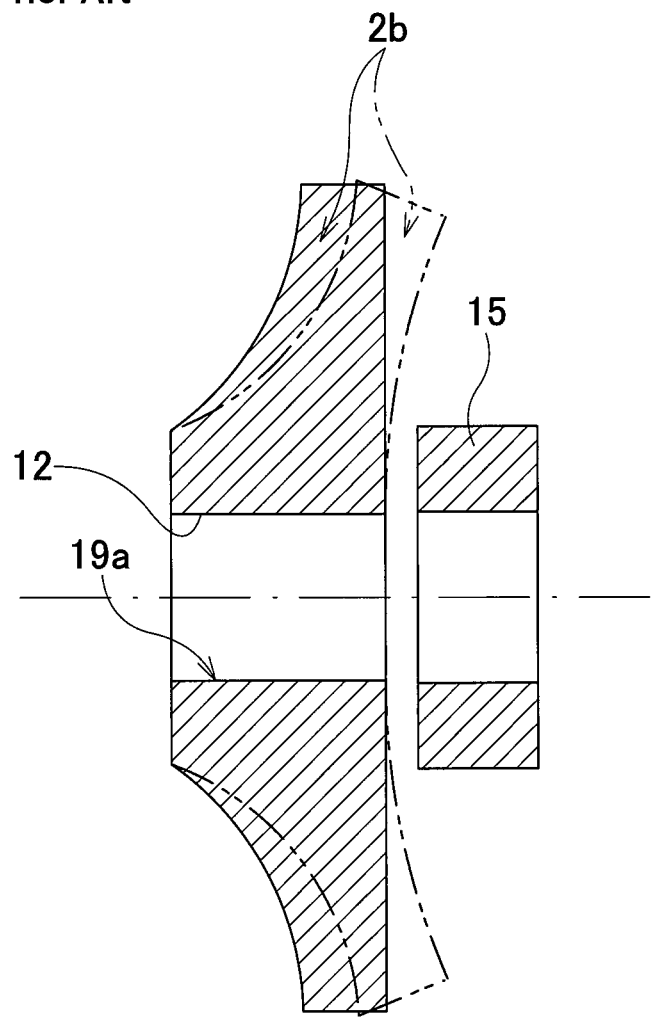
FIG. 7 is a schematic view exaggeratingly illustrating elastic deformation of the other input-side disk in a second example of conventional construction of a toroidal continuously variable transmission.

With the toroidal continuously variable transmission of this example, the occurrence of fletching wear between the input-side disk 2c and the locking ring 15 due to thrust generated by the pressing device 9a is prevented. In other words, in the case of the second example of conventional construction illustrated in FIG. 3 to FIG. 6, a female spline section 12 is provided in the range from the middle section to the other end section in the axial direction of the inner-circumferential surface of the input-side disk 2b, and the female spline section 12 and a male spline section 13 that is formed around the outer-circumferential surface of a part of the other end section in the axial direction of the input rotating shaft 1a engage. Moreover, as exaggeratedly illustrated in FIG. 7, the other input-side disk 2b is such that when a force is applied from the power rollers 6 due to thrust that is generated by the pressing device 9a, the portion near the outer diameter of the other input-side disk 2b elastically deforms toward the other end side in the axial direction (right side in FIG. 7). When this happens, of the center hole 19a that is provided in the center section of the other input-side disk 2b, the other end section in the axial direction of the other input-side disk 2b is pressed against the outer-circumferential surface of the input rotating shaft 1a, and the inner diameter thereof elastically deforms in the contracting direction (reduced diameter direction).

On the other hand, in the case of this example, a disk-side fitting surface section 22 and a shaft-side fitting surface section 23, both having a circular cross-sectional shape, fit together with an interference fit in a portion of the engaging section (fitting section) between the inner circumferential surface of the center hole 19 in the other input-side disk 2c and the outer-circumferential surface of the input rotating shaft 1b that is adjacent to one end side of the area of contact in the axial direction between the other end surface in the axial direction of the other input-side disk 2c and one end surface in the axial direction of the locking ring 15. Therefore, the support rigidity of the other end section in the axial direction of the other input-side disk 2c with respect to the input rotating shaft 1b becomes higher than in the second example of conventional construction. Moreover, the rigidity in the contracted radial direction of the other end section in the axial direction of the inner-circumferential surface of the center hole 19 of the other input-side disk 2c becomes high, elastic deformation of the other end section in the axial direction of the other input-side disk 2c in the contracted radial direction due to thrust that is generated by the pressing device 9a is suppressed, and furthermore, elastic deformation of the portion near the outer diameter of the other input-side disk 2c toward the other end side in the axial direction is suppressed (it is possible to make the amount of elastic deformation in the axial direction of the portion near the outer diameter of the other input-side disk 2c small). Therefore, it is possible to prevent severe fletching wear that occurs between the other end surface in the axial direction of the other input-side disk 2c and the one end surface in the axial direction of the locking ring 15 due to rubbing between the other end surface in the axial direction of the other input-side disk 2c and the one end surface in the axial direction of the locking ring 15.

Moreover, in this example, a female-spline section 12a is formed in the middle section in the axial direction of the inner-circumferential surface of the center hole 19, and the edge of the other end in the axial direction of female-spline grooves of the female-spline section 12a and the surface of the one end in the axial direction of the locking ring 15 are separated by a gap from each other in the axial direction. Therefore, even when the portion near the outer diameter of the input-side disk 2c elastically deforms toward the other side in the axial direction due to thrust that is generated by the pressing device 9a, the edge of the other end in the axial direction of the female-spline grooves of the female-spline section 12a does not bite into the surface of the one end in the axial direction of the locking ring 15. From this aspect as well, the occurrence of fletching wear between the input-side disk 2c and the locking ring 15 is prevented.

Furthermore, in this example, of the inner-circumferential surface of the center hole 19 of the input-side disk 2c, on one end section in the axial direction that will be the front side in the insert direction of the input rotating shaft 1b when assembling the other input-side disk 2c on the input rotating shaft 1b, a disk-side cylindrical surface section 21 having an inner diameter that is larger than the root diameter $d_{max}$ of the female-spline section 12a is provided. Therefore, in the initial state of the assembly work, by fitting the shaft-side fitting surface section 23 and the male-spline section 13a inside the disk-side cylindrical surface section 21 with a clearance fit, it is possible to perform alignment of the outer input-side disk 2c and the input rotating shaft 1b. As a result, the work of assembling the toroidal continuously variable transmission is simplified.

In this example, the disk-side cylindrical surface section 21 that is formed on one end section in the axial direction of the inner-circumferential surface of the center hole 19 in the other input-side disk 2c is fitted around the portion of the outer-circumferential surface of the input rotating shaft 1b that is adjacent to the one end side in the axial direction of the male spline section 13a. However, it is also possible to form a shaft-side cylindrical surface section in that portion having a circular shape that is centered around the center axis of the input rotating shaft 1b and of which the outer diameter in the axial direction does not change in the axial direction, and to make the outer diameter of this shaft-side cylindrical surface section in the free state a little larger than the inner diameter of the disk-side cylindrical surface section in the free state, and to pressure fit the disk-side cylindrical surface section 21 around the shaft-side cylindrical surface section with an interference fit. By fitting the disk-side cylindrical surface section 21 and shaft-side cylindrical surface section together with an interference fit, the concentricity of the other input-side disk 2c and the input rotating shaft 1b can be improved (the amount of eccentricity and the inclination angles of the center axes can be reduced), and thus various performance of the toroidal continuously variable transmission can be further improved. For example, it becomes possible to reduce a whirling motion of the other input-side disk 2c, lower vibration and improve the precision of gear ratio control.

Figure 2:
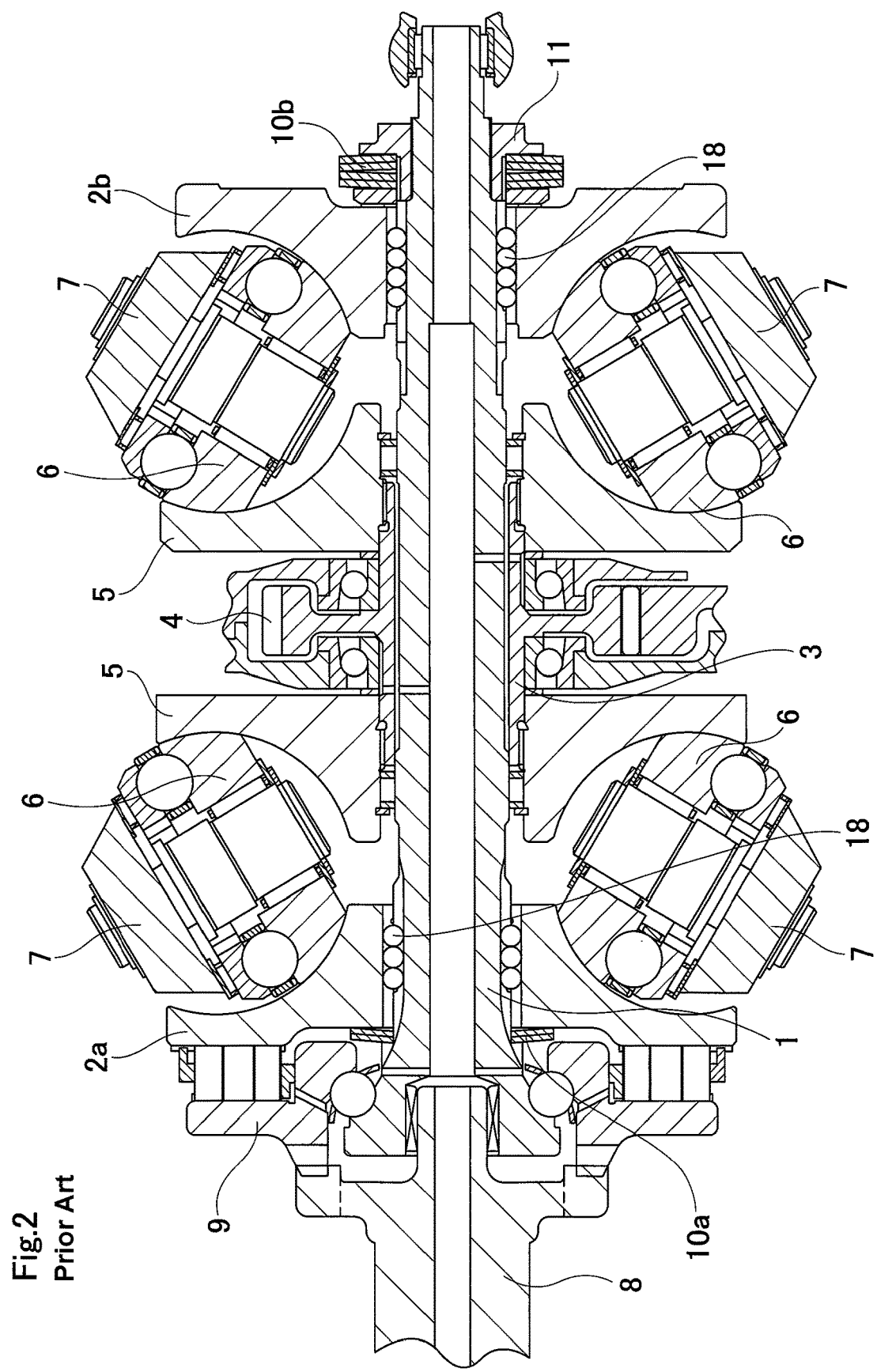
FIG. 2 is a cross-sectional view illustrating a first example of conventional construction of a toroidal continuously variable transmission.
Figure 3:
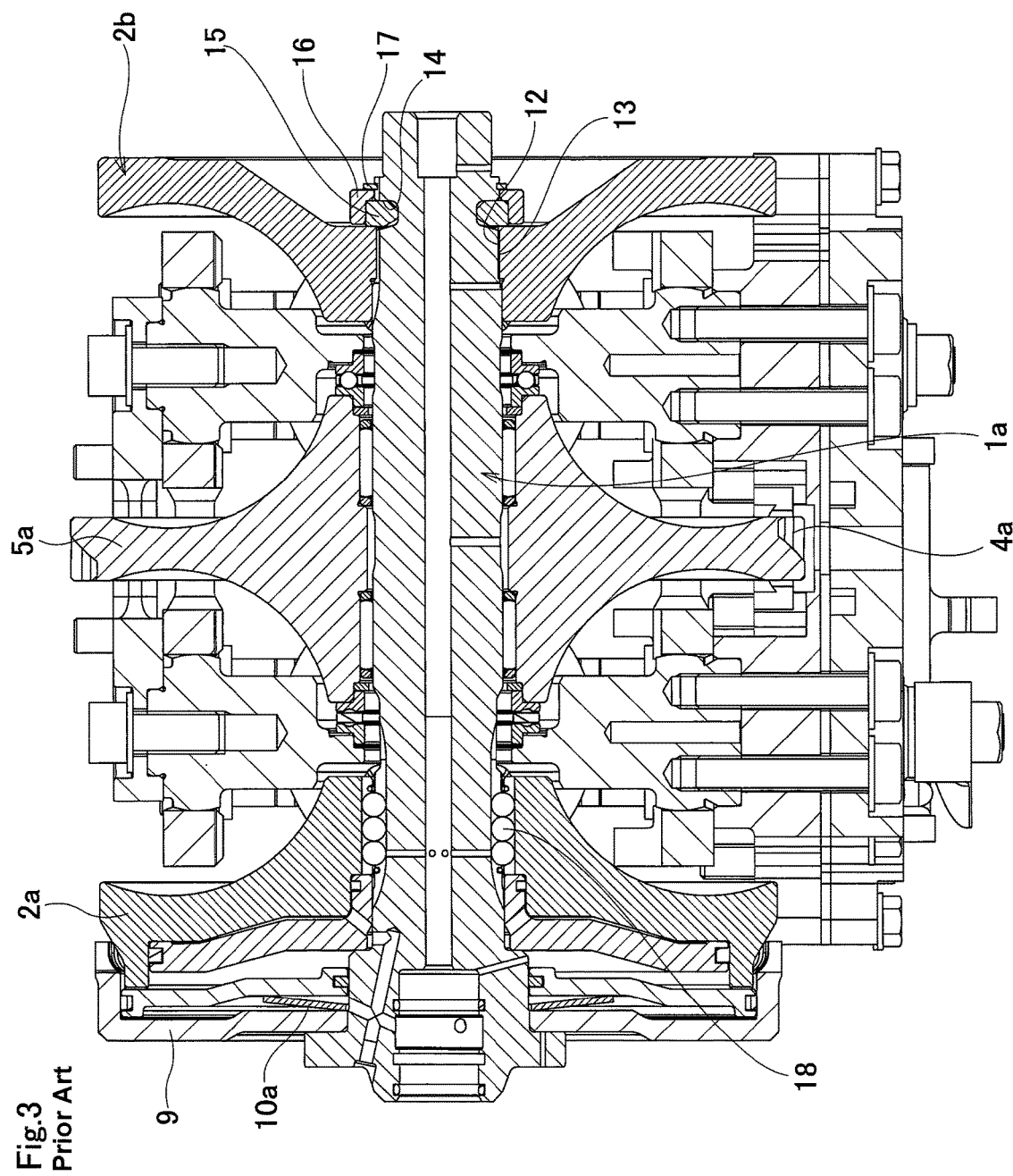
FIG. 3 is a cross-sectional view illustrating a second example of conventional construction of a toroidal continuously variable transmission.
Figure 4A:
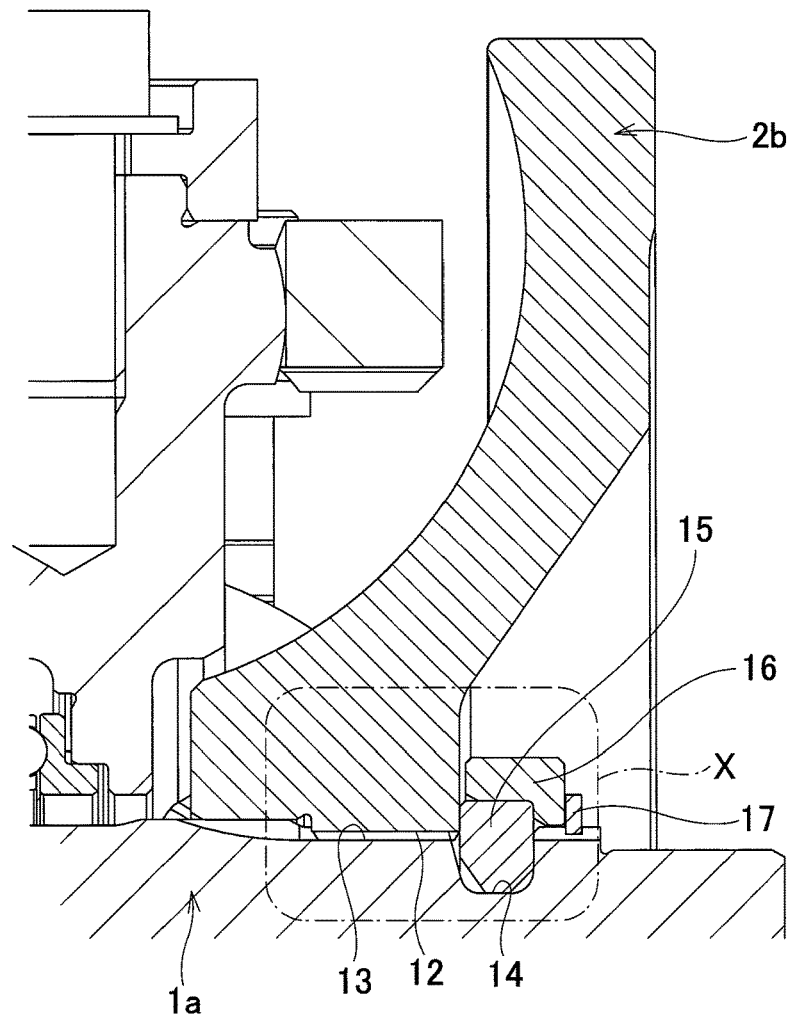
FIG. 4A is an enlarged view of the upper right half section in FIG. 3.
Figure 4B:
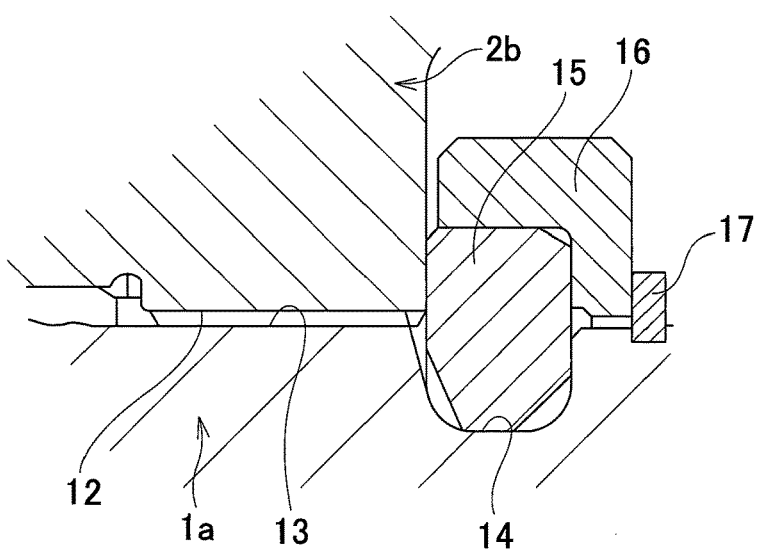
FIG. 4B is an enlarged view of area X in FIG. 4A.
Figure 5:
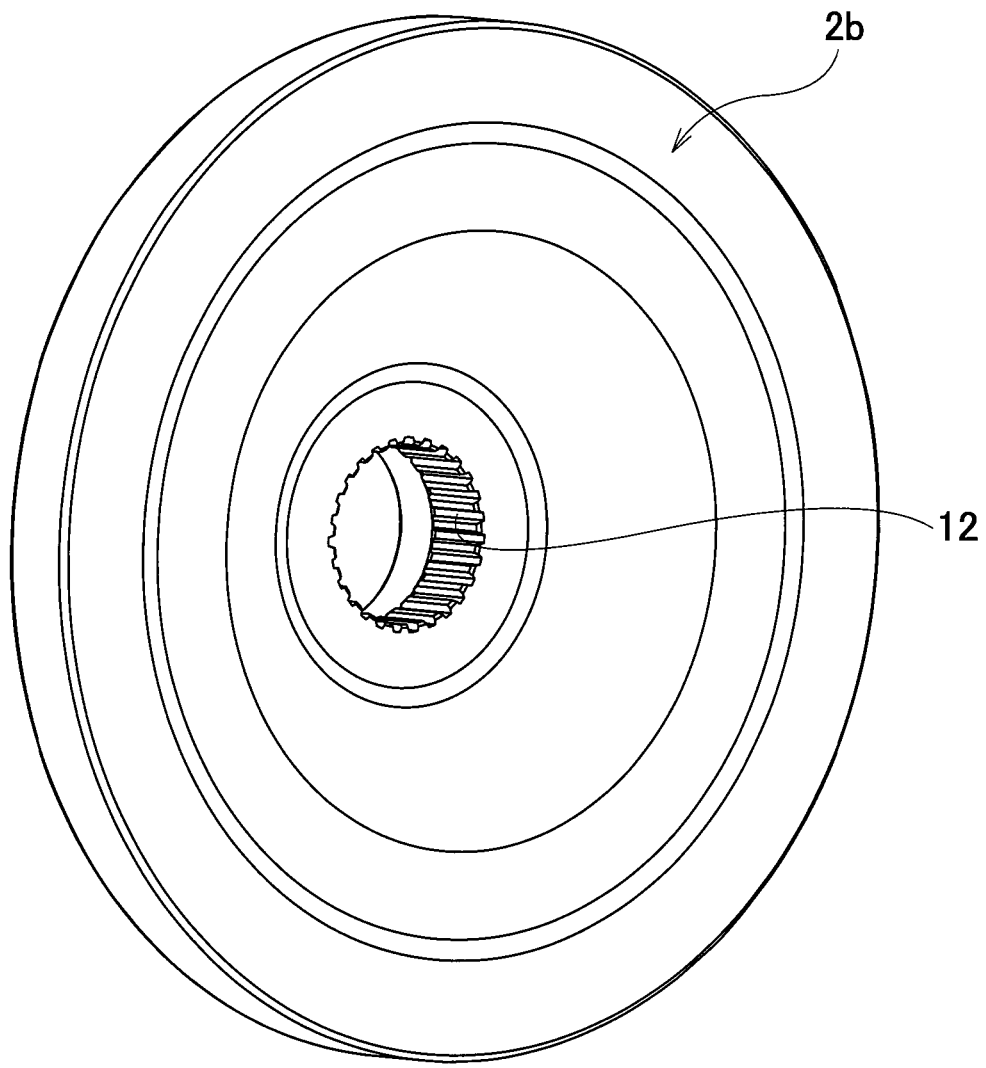
FIG. 5 is a perspective view illustrating the other input-side disk of a second example of conventional construction of a toroidal continuously variable transmission.
Figure 6:
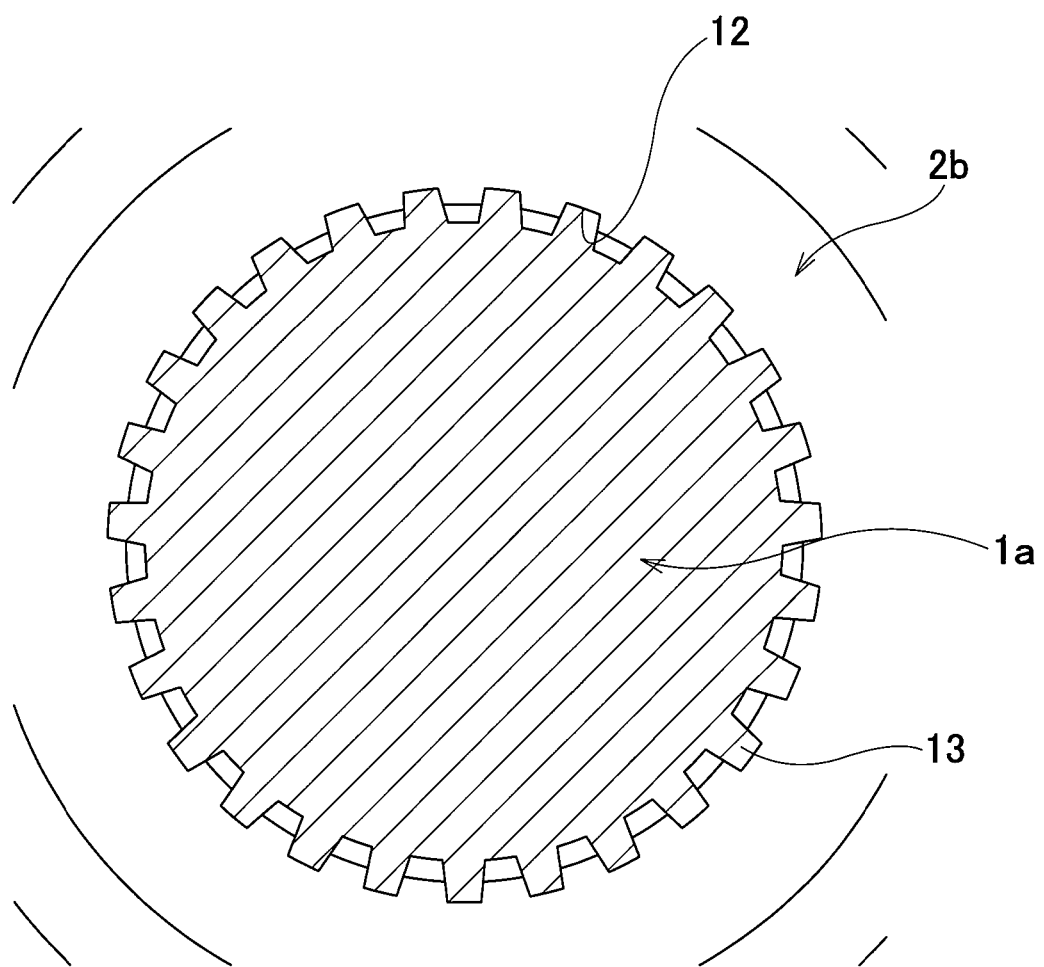
FIG. 6 is a cross-sectional view illustrating the engagement section between the other input-side disk and input rotating shaft in a second example of conventional construction of a toroidal continuously variable transmission.

When embodying the present invention, it is also possible to use a loading nut 11 such as illustrated in FIG. 2 as a locking member in order to prevent the other input-side disk 2c from displacing toward the other end side in the axial direction of the input rotating shaft 1b. Moreover, the present invention is not limited to a half toroidal continuously variable transmission, and can also be applied to a full toroidal continuously variable transmission.

EXPLANATION OF REFERENCE NUMBERS 1, 1a, 1b Input rotating shaft
2a to 2c Input-side disk
3 Output cylinder
4, 4a Output gear
5, 5a Output-side disk
6 Power roller
7 Trunnion
8 Drive shaft
9, 9a Pressing device
10a, 10b Pre-loaded spring
11 Loading nut
12, 12a Female spline section
13, 13a Male spline section
14 Locking groove
15 Locking ring
16 Restraining ring
17 Retaining ring
18 Ball spline
19, 19a Center hole
20 Support column
21 Disk-side cylindrical surface section
22 Disk-side fitting surface section
23 Shaft-side fitting surface section

What is claimed is:
1. A toroidal continuously variable transmission, comprising:
a rotating shaft;
a pair of outside disks, each comprising one side surface in an axial direction of the rotating shaft that has a circular arc-shaped cross section and that faces inward in the axial direction of the rotating shaft, and the outside disks being respectively supported by one end section and another end section of the rotating shaft so as to rotate in synchronization with the rotating shaft;
an inside disk comprising side surfaces on both sides in the axial direction of the rotating shaft, each surface having a circular arc-shaped cross section that faces outward in the axial direction of the rotating shaft, and the inside disk being supported around a middle section in the axial direction of the rotating shaft with each of the side surfaces on both sides in the axial direction facing the one side surfaces in the axial direction of the pair of outside disks so as to rotate freely relative to the rotating shaft;
plural support members, each comprising a pivot shaft in a skewed position with respect to the rotating shaft, with the plural support members provided between the both side surfaces in the axial direction of the inside disk and the one side surfaces in the axial direction of the pair of outside disks so as to be able to pivotally displace freely centered around the pivot shaft;
plural power rollers supported by the support members so as to roll freely, each comprising a circumferential surface that is a spherical convex surface, with the circumferential surfaces coming in contact with the both side surfaces in the axial direction of the inside disk and the one side surfaces in the axial direction of the pair of outside disks;

a pressing device provided between the rotating shaft and one of the outside disks of the pair of outside disks that is arranged on one end section of the rotating shaft, and the pressing device pressing the one outside disk toward another outside disk of the pair of outside disks that is arranged on the other end section of the rotating shaft; and a locking member locked in a portion of the other end section in the axial direction of the rotating shaft that protrudes toward the other end side from the other outside disk, and that prevents the other outside disk from displacing in a direction away from the one outside disk; wherein a female-spline section is formed around a middle section in the axial direction of an inner-circumferential surface of the other outside disk, and a disk-side fitting surface section having a circular cross-sectional shape is formed around a portion of the inner-circumferential surface of the other outside disk that is adjacent to the other end side of the female-spline section;

a male-spline section is formed around the other end section in the axial direction of an outer-circumferential surface of the rotating shaft, and a shaft-side fitting surface section having a circular cross-sectional shape is formed around a portion of the outer-circumferential surface of the rotating shaft that is adjacent to the other end side of the male-spline section; and the female-spline section and the male-spline section fit with a spline fit, and the disk-side fitting surface section and the shaft-side fitting surface section fit together with an interference fit.

* * * * *